US011632434B2

(12) United States Patent
Lawrenson et al.

(10) Patent No.: US 11,632,434 B2
(45) Date of Patent: *Apr. 18, 2023

(54) NETWORK FUNCTIONS VIRTUALIZATION IN AD-HOC GROUPS

(71) Applicant: Telefonaktiebolaget LM Ericsson (publ), Stockholm (SE)

(72) Inventors: Matthew John Lawrenson, Bussigny (CH); Till Burkert, Huddinge (SE); Christopher Cox, Cambridge (GB); Julian Charles Nolan, Pully (CH)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,600

(22) Filed: Dec. 21, 2021

(65) Prior Publication Data
US 2022/0116464 A1 Apr. 14, 2022

Related U.S. Application Data

(63) Continuation of application No. 15/512,645, filed as application No. PCT/SE2014/051102 on Sep. 25, 2014, now Pat. No. 11,218,552.

(51) Int. Cl.
*H04L 67/51* (2022.01)
*H04W 64/00* (2009.01)
(Continued)

(52) U.S. Cl.
CPC .............. *H04L 67/51* (2022.05); *H04L 41/08* (2013.01); *H04L 41/0806* (2013.01);
(Continued)

(58) Field of Classification Search
CPC ..... H04L 41/08; H04L 41/0806; H04L 41/12; H04L 67/51; H04L 67/59; H04W 8/18; H04W 64/00; H04W 84/18
See application file for complete search history.

(56) References Cited

U.S. PATENT DOCUMENTS

2005/0111428 A1* 5/2005 Orlik ..................... H04W 40/10 370/344
2006/0023677 A1* 2/2006 Labrador .............. H04W 40/12 370/338
(Continued)

FOREIGN PATENT DOCUMENTS

CN 103260194 A 8/2013
CN 103501232 A 1/2014
(Continued)

OTHER PUBLICATIONS

ETSI "Network Functions Virtualization (NFV); Architectural Framework", https://www.etsi.org/deliver/etsi_gs/nfv/001_099/002/01.01.01_60/gs_nfv002v010101p.pdf (Year: 2013).*
(Continued)

*Primary Examiner* — James E Springer
*Assistant Examiner* — Patrick F Ngankam
(74) *Attorney, Agent, or Firm* — Coats & Bennett, PLLC

(57) ABSTRACT

The present disclosure relates to virtualizing a network function in an ad-hoc group. The ad-hoc group comprises a plurality of mobile terminals that are configured for device-to-device communication, e.g., Proximity-Based Services (ProSe). The ProSe-enabled mobile terminals subscribe to a Network Functions Virtualization (NFV) service with an NFV management server. The NFV management server discovers the ad-hoc group that is suitable for NFV and informs an NFV application server of the ad-hoc group. The NFV application server then downloads data and configuration parameters to the ad-hoc group to offload a network function to the ad-hoc group for execution.

6 Claims, 13 Drawing Sheets

(51) Int. Cl.
*H04W 8/18* (2009.01)
*H04L 41/0806* (2022.01)
*H04L 67/59* (2022.01)
*H04L 41/08* (2022.01)
*H04L 41/12* (2022.01)
*H04W 84/18* (2009.01)

(52) U.S. Cl.
CPC .............. *H04L 41/12* (2013.01); *H04L 67/59* (2022.05); *H04W 8/18* (2013.01); *H04W 64/00* (2013.01); *H04W 84/18* (2013.01)

(56) References Cited

U.S. PATENT DOCUMENTS

| | | | |
|---|---|---|---|
| 2007/0195702 A1* | 8/2007 | Yuen | H04L 45/122 370/238 |
| 2014/0229945 A1 | 8/2014 | Barkai et al. | |
| 2014/0241247 A1 | 8/2014 | Kempf et al. | |

FOREIGN PATENT DOCUMENTS

| | | |
|---|---|---|
| EP | 2750328 A1 | 7/2014 |
| WO | 2014125486 A1 | 8/2014 |

OTHER PUBLICATIONS

ETSI, "Network Functions Virtualisation (NFV); Architectural Framework", ETSI GS NFV 002 V1.1.1, Mar. 2013, pp. 1-21.

Ericsson White Paper, "The Real-Time Cloud", Uen 284 23-3219 Rev. B, Feb. 2014, pp. 1-11.

Chiosi, M. et al., "Network Functions Virtualisation; An Introduction, Benefits, Enablers, Challenges & Call for Action", SDN and Open Flow World Congress, Oct. 22-24, 2012, pp. 1-16.

3rd Generation Partnership Project, "Technical Specification Group Services and System Aspects; Proximity-based services (ProSe); Stage 2 (Release 12)", 3GPP TS 23.303 V12.2.0, Sep. 2014, pp. 1-61.

Liu, X., "Research on Computation Offloading Technique in Vehicle Ad-Hoc Network", Database of Excellent Master's Degree Theses in China, Information Technology Edition, No. 2, I136-290, Feb. 15, 2014, pp. 1-40.

\* cited by examiner

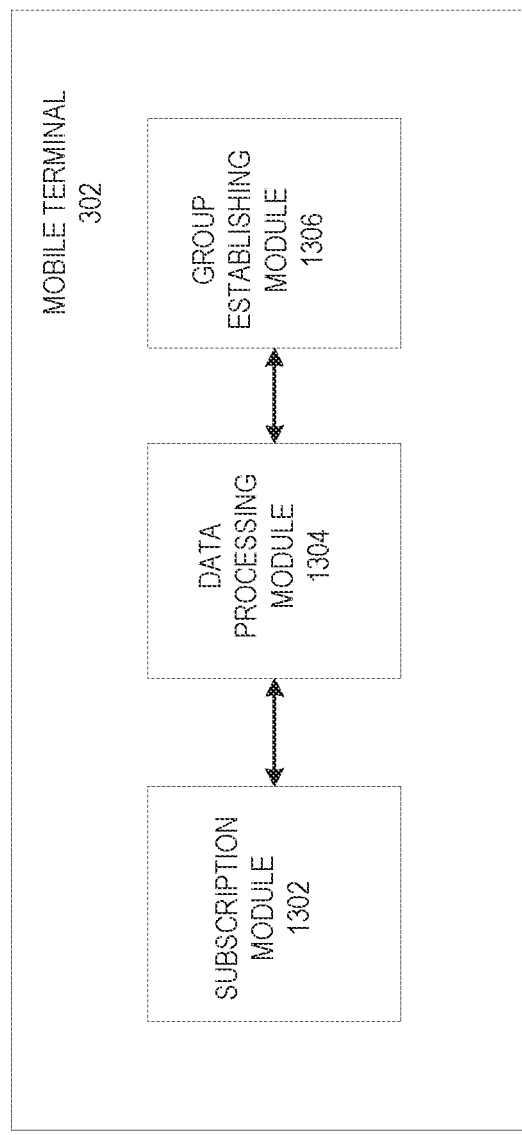

NETWORK FUNCTIONS VIRTUALIZATION IN AD-HOC GROUPS

RELATED APPLICATIONS

The present application is a continuation application of U.S. patent application Ser. No. 15/512,645, which was filed on Mar. 20, 2017, which is a national stage application of PCT/SE2014/051102, which was filed Sep. 25, 2014, the disclosures of each of which are incorporated herein by reference in their entirety.

TECHNICAL FIELD

The present application relates generally to network functions virtualization, and specifically to implementing network functions virtualization in an ad-hoc group of mobile terminals.

BACKGROUND

In traditional mobile telecommunication networks, network functions are implemented mostly on proprietary hardware. For example, radio access functionalities are provided by a radio access network. A radio access network comprises base stations or access points that are proprietary equipment provided by operators or premise owners. Core network nodes, such as gateways and routers, are also owned and operated by carriers. Relying on proprietary hardware to implement new services has several disadvantages. For example, launching a new service often means that a new variety of appliances has to be introduced. Capital expenditure and skilled staff is also needed to design, integrate and operate the new appliances. As technology innovation accelerates, the life cycle of hardware becomes increasingly shorter.

Network Functions Virtualization (NFV) is a recent technology development aiming to address the disadvantages of implementing network functions or services on proprietary hardware. In NFV, network functions are implemented as software running on industry-standard servers. The software can be run from essentially any location within the network, without the need of installing new equipment. With NFV, there is a reduced need of proprietary hardware. Separate equipment can be consolidated. Also with NFV, the time to market is faster and the capital expenditure is less.

Current NFV implementations focus on network nodes within a network. There is a need to extend the current NFV implementations beyond the network nodes.

SUMMARY

The present disclosure relates to offloading a network function onto a group of mobile terminals that are capable of device-to-device communication. NFV is usually implemented on servers which are part of the network, not on user equipment or mobile terminals. Mobile terminals often have spare capacity or processing power for computing tasks. However, individual mobile terminals have spare capacities that are small when compared to the processing power required for executing a network function. Because of this, NFV is normally not implemented on mobile terminals. The present application discloses advantageous methods and apparatus for offloading a network function to mobile terminals.

In some embodiments, a network function is offloaded from the network to a plurality of mobile terminals. The plurality of mobile terminals is located in close proximity to each other, forming an ad-hoc group. After the number of mobile terminals in the ad-hoc group is determined to be suitable for the network function, the ad-hoc group is selected for performing the network function. The execution of a network function is distributed among the ad-hoc group comprising the plurality of mobile terminals.

In some embodiments, an NFV system involves an NFV management server and an NFV application server. The NFV management server monitors and manages ad-hoc groups. The NFV management server is also configured to select appropriate ad-hoc groups and inform the NFV application server of the selected ad-hoc groups. The NFV application server controls the virtualization process of a network function among a selected ad-hoc group.

In some embodiments, an NFV application server manages an ad-hoc group selected by an NFV management server when the ad-hoc group executes a network function. The NFV application server receives a notification from the NFV management server indicating that the ad-hoc group has been selected for performing a network function. The NFV application server sends data and configuration parameters needed for the execution of the network function to the mobile terminals in the ad-hoc group. After the execution of the network function is finished, the NFV application server collects a result related to the execution of the network function from the ad-hoc group.

BRIEF DESCRIPTION OF THE DRAWINGS

FIG. 13 illustrates exemplary software modules implemented for a ProSe-enabled NFV-enabled mobile terminal.

DETAILED DESCRIPTION

Figure 1:
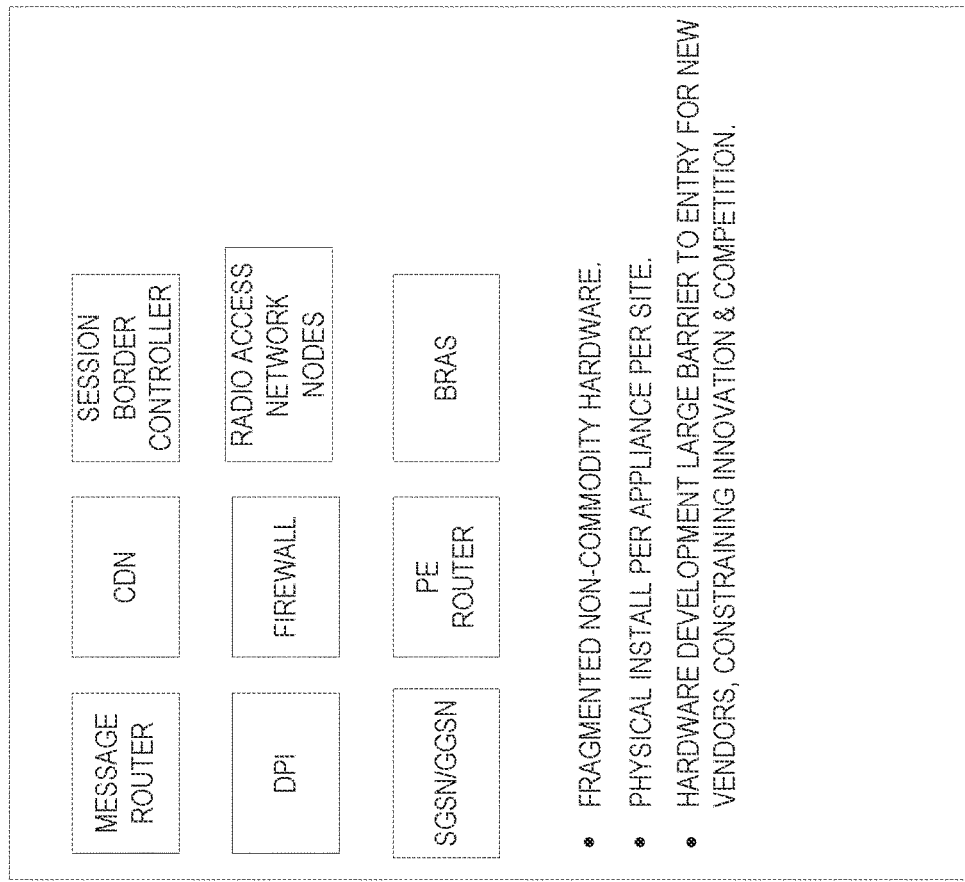
FIG. 1 is a diagram illustrating two different approaches to implementing a network function.

The present disclosure relates to implementing Network Functions Virtualization (NFV) in an ad-hoc group. In standard NFV, a network function is implemented as software that runs on industry standard servers. FIG. 1 compares an NFV approach with a traditional network appliance approach to deploying a new network service. The left side of FIG. 1 depicts a list of proprietary hardware that is still widely used in current telecommunications networks. The exemplary hardware shown in FIG. 1 provides some well-known services or functions. For example, message routers are switching equipment responsible for directing data or signals to the destinations. Deep Packet Inspection (DPI) boxes are used for traffic analysis and control. GPRS (General Packet Radio Service) Support Nodes such as Serving GPRS Support Nodes (SGSNs) and Gateway GPRS Support Nodes (GGSNs) are mobile network nodes used for routing traffic to and from a mobile user, and for mobility management. In the traditional network appliance approach, routers, DPI boxes, SGSN/GGSN are non-commodity hardware that require on-site installment when a new function or service is introduced.

The right side of FIG. 1 depicts what is entailed when a network function is implemented using an NFV approach. In NFV, new network functionalities or services are provided by software vendors. The software runs on virtual appliances which are hosted by industry standard servers. The industry standard servers are supported by standard high volume storage. The servers are connected to the network via standard network switches such as Ethernet switches. As shown in FIG. 1, when a new network function is introduced, it is implemented as software running on standard equipment, eliminating the need of proprietary equipment.

In FIG. 1, NFV is implemented on standard servers located within a network. The present disclosure teaches implementing NFV using an ad-hoc group that comprises a plurality of mobile terminals located in close proximity of each other. Mobile terminals often have spare processing power and capacity that are left un-utilized. Although the execution of a typical network function generally requires processing power far exceeding the capacity of each individual mobile terminal, the total capacity that a group of mobile terminals can provide are often sufficient for many network functions.

In certain cases, a network function can be partitioned into a number of mutually independent tasks. Each task can be offloaded to a mobile terminal for execution without cooperation from other mobile terminals. However, most network functions can't be easily partitioned into mutually independent tasks. For example, in a self-optimizing network (SON), the radio access network needs to adapt itself for tasks such as mobility load balancing and mobility robustness optimization. Both mobility load balancing and mobility robustness optimization are network functions that can't be easily partitioned into mutually independent tasks. To offload such network functions to mobile terminals, communication and coordination between the mobile terminals are necessary.

An ad-hoc group of mobile terminals is a group of devices that communicate directly with each other by means of, e.g., Wi-Fi Direct technology, without a central controller, e.g., a Wi-Fi access point. All the devices in an ad-hoc group have equal status. Each device can communicate with any of the other devices within the ad-hoc group without relying on a central controller to control the flow of information. The technical specifications for device-to-device communications are set forth in 3GPP TS 23.303 V12.1.0, known as 3GPP Technical Specification on Proximity-Based Services (ProSe).

Figure 2:
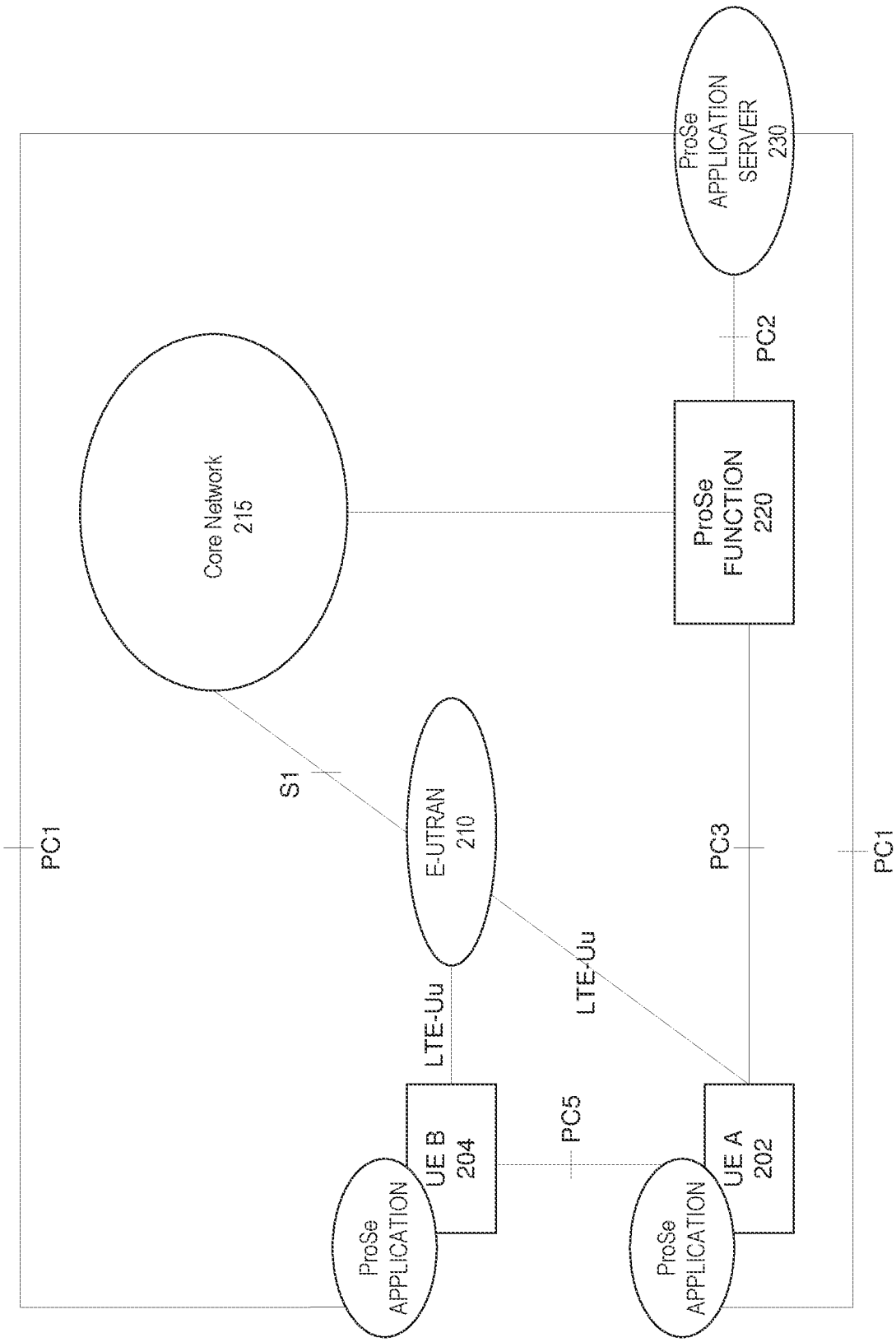
FIG. 2 illustrates an exemplary architecture for Proximity-Based Services (ProSe).

FIG. 2 provides a block diagram illustrating an exemplary ProSe implementation in a Long Term Evolution (LTE) network. In FIG. 2, two ProSe-enabled User Equipments (UE A 202 and UE B 204) are connected to an Evolved UMTS (Universal Mobile Telecommunications System) Terrestrial Radio Access Network (E-UTRAN) 210 via radio access links (LTE-Uu). The E-UTRAN 210 is connected to a core network 215 via an S1 interface. Two network nodes 220 and 230 are configured to support ProSe. The network node 220 is configured as a ProSe Function and the network node 230 is configured as a ProSe Application Server. The two network nodes, 220 and 230, may be implemented as two logical nodes running on a same physical node or as two separate physical nodes. In FIG. 2, PC1 and PC3 are labels for the logical links between the UEs (UE A 202 and UE B 204) and the network node 230 and 220 respectively. PC2 refers to the logical link between the network node 220 and the network node 230. PC5 refers to the logical link between the two UEs.

The network node 220, configured as a ProSe Function, supports both ProSe discovery and ProSe direct communication. ProSe discovery and ProSe direct communication are two main aspects introduced in the 3GPP ProSe standards. ProSe discovery is a discovery process in which two or more ProSe-enabled devices are discovered to be nearby. ProSe direct communication refers to the direct communications between nearby ProSe-enabled devices. The communication protocol employed in ProSe direct communication may be Wi-Fi Direct, a modification of LTE radio access protocol, or some other suitable protocols.

The network node 230, configured as a ProSe Application Server, provides applications that make use of proximity services. UE A 202 and UE B 204 each run ProSe application software, such as a ProSe application client. The ProSe application software on UE A 202 and UE B 204 communicate with the ProSe Application Server 230 to support applications related to proximity services.

UE A 202 and UE B 204 may be part of an ad-hoc group that comprises a plurality of mobile terminals. When the ad-hoc group remains relatively steady and at least some of the mobile terminals stay in the group for an extended period of time, the ad-hoc group has substantial collective spare capacity and certain network functions may be offloaded onto the ad-hoc group during network functions virtualization.

Figure 3:
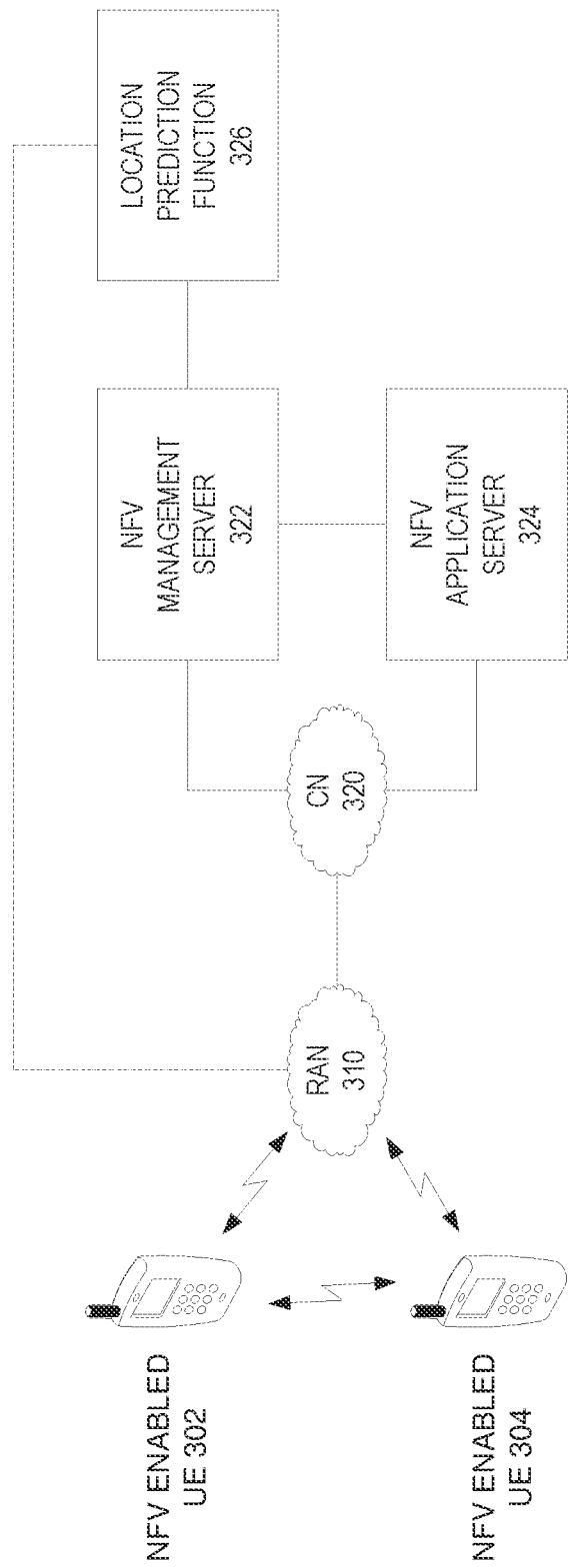
FIG. 3 illustrates an exemplary architecture for NFV in an ad-hoc network.

FIG. 3 illustrates an exemplary system configured for implementing NFV in an ad-hoc network in the context of a 4G LTE network 300. The methods and techniques disclosed herein are equally applicable to other types of networks. In FIG. 3, two mobile terminals or UEs, 302 and 304, are ProSe-enabled and are connected to an LTE core network 320 via a radio access network 310. An NFV management server 322 and NFV application server 324 are located within the core network and are configured to support NFV in an ad-hoc group. A location prediction function 326 is connected to the NFV management server 322. The location prediction function 326 may be optionally connected to the radio access network 310 for retrieving information pertaining to a respective location of UEs 302 and 304.

In FIG. 3, the NFV management server 322 is configured to communicate with the NFV application server 324 and the location prediction function 326. The NFV management server 322 manages the mobile terminal's subscription to NFV services and handles NFV related tasks. The NFV management server may also perform some ProSe functions. The NFV application server 324 manages one or more network functions that may benefit from being offloaded to an ad-hoc group. The location prediction function 326 is configured to generate location predictions of moving mobile terminals, UEs 302 and 304, and estimate a duration of the ad-hoc group.

The location prediction function 326 is configured to generate location predictions of the moving UEs, 302 and 304, and predict how long the moving UEs will likely stay within the group. In some embodiments, the location function 326 is implemented on a device comprising a memory and processing circuits. The memory is configured for storing data related to the location and velocity of each UE. The location of a UE may be determined in different ways, for example, using Global Positioning System (GPS), radio triangulation methods, cell-ID based techniques, or relying on crowd-sourced databases. The processing circuits are configured for generating future locations for each UE based on the stored location and velocity data. For example, the location prediction function 326 may determine that a group of mobile terminals are inside an arena during a sporting event. The location prediction function 326 may conclude that the group of mobile terminals most likely will stay together for the duration of the event. For another example, the location prediction function 326 may determine that a group of mobile terminals are located inside a hotel and that all of them are stationary. The location prediction function 326 may predict that, since it is nighttime, that the mobile terminals will most likely remain inside the hotel until dawn tomorrow. Another example is a group of travelers travelling on a train. Based on their location (e.g., on a train track) and their unusually-high velocity, the location prediction function may predict that the group of terminals will stay as a group at least until the next train stop. Information other than location and velocity, such as train schedules, geographic data, social events, and holidays, can be supplied to the location prediction function 326 to facilitate and improve location prediction. Alternatively, location prediction function 326 may acquire such information from third parties, e.g., from a local public transport service.

In FIG. 3, only two mobile terminals, UE 302 and UE 304, are shown. The two mobile terminals are part of an ad-hoc group that includes a plurality of mobile terminals located in close proximity, each capable of device-to-device communication. The number of mobile terminals in the ad-hoc group may potentially be much larger than two and one may envisage scenarios with ad-hoc groups comprising tens, hundreds, or even thousands, of mobile terminals, e.g., at sporting events. All the mobile terminals in the ad-hoc group, including UE 302 and UE 304, are ProSe enabled and NFV enabled. In some embodiments, the NFV enabled UEs are configured to run NFV management software, e.g., an NFV management client.

The NFV management server 322 interacts with the NFV management software on the UEs. In some embodiments, a generic NFV server (not shown) may be used to provide generic NFV services. The NFV management server 322 provides an interface between the UEs and the generic NFV server. The NFV management server 322 is configured to manage the mobile terminals' subscription to NFV services and control the NFV management software on the UEs. In one embodiment, the NFV management server 322 is configured to download the NFV management software to the mobile terminals.

In FIG. 3, the NFV management server 322 is also configured to perform the role of a ProSe application server. The NFV management server 322 may be configured to select an ad-hoc group for offloading a network function. The ad-hoc group may be selected based on a set of criteria. The criteria may be different for different tasks. The criteria may be different under different conditions. For example, the NFV management server 322 may collect a profile for each mobile terminal. The profile includes the mobile terminal's capabilities, how much battery power is left, and the mobile terminal's spare processing capacity. Based on the collected profiles, the NFV management server 322 determines that the mobile terminals are ProSe-enabled and NFV enabled. The NFV management server 322 communicates with a ProSe Function 220 to set up an ad-hoc group among the mobile terminals by turning on device-to-device communication between the mobile terminals.

The NFV management server 322 is configured to communicate with the NFV application server 324. In some embodiments, each mobile terminal is required to subscribe to the NFV application service for a particular network function before the network function can be offloaded to the mobile terminal. The NFV application server 324 manages mobile terminals' subscription to individual NFV application services. The NFV application server 324 also manages the NFV application software (e.g., NFV application clients) installed on the mobile terminals. In some embodiments, the NFV application server 324 is configured to download the NFV application software to the mobile terminals.

After the NFV management server 322 has selected an ad-hoc group for a network function, the NFV management server 322 notifies the NFV application server of the selected ad-hoc group. In some embodiments, the NFV management server 322 selects an ad-hoc group for a specific network function based on the criteria specified for that network function. In some embodiments, the NFV management server 322 selects an ad-hoc group as a candidate ad-hoc group based on a set of generic criteria, such as the spare capacities of each mobile terminal, the duration the group will remain together, etc. In some embodiments, one of the criteria is whether the number of mobile terminals is the ad-hoc group has exceeded a threshold. The NFV management server 322 notifies the NFV application server 324 after a candidate ad-hoc group has been selected. The NFV application server 324 is responsible for deciding which network function to be offloaded to the selected ad-hoc group.

Once a network function is selected for being offloaded to the ad-hoc group, the NFV application server 324 downloads to the mobile terminals the data and configuration parameters necessary for executing the network function, in response to a request from the NFV management server 322. In some embodiments, the NFV application server 322 may partition the network function into separate tasks and assign each task to individual mobile terminals. The NFV application server 324 may download data and configuration parameters to each mobile terminal according to the task assigned to that mobile terminal. In some embodiments, the NFV application server 322 may download the data and configuration parameters to one mobile terminal or all mobile terminals. The NFV application software installed on the mobile terminals may autonomously determine among the group how to partition the task of executing the network function. Data and configuration parameters may be exchanged among the group according to how the task is divided up. When ready, the mobile terminals in the ad-hoc group start execution of the network function.

In some cases, a mobile terminal may leave an ad-hoc group while the execution of the network function is in progress. In some cases, new mobile terminals may move into the group. The NFV management server 322 is configured to detect changes in the ad-hoc group and notify the NFV application server 324 of the changes. In some embodiments, the NFV management server 322 may request the NFV application server 324 to re-allocate data and configuration parameters. Upon receiving a request from the NFV management server 322, the NFV application server 324 re-allocates data and configuration parameters based on the detected changes in the ad-hoc group. The NFV application server 324 also collects a result when the execution of the network function is finished. The result may be an ACK/NACK feedback or data from a calculation or reports from an analysis, depending on the type of the network function.

Figure 4:
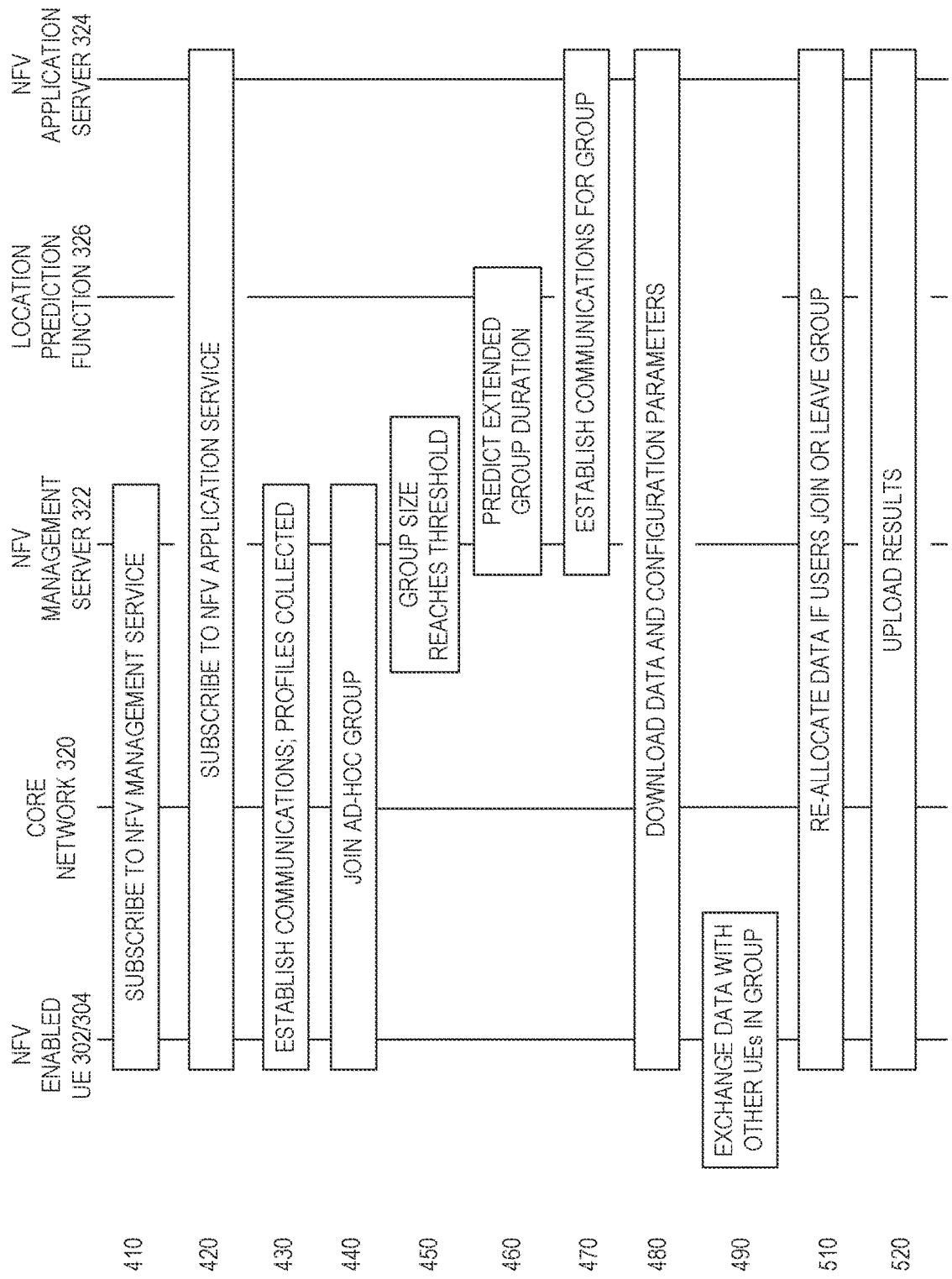
FIG. 4 is a flowchart illustrating an exemplary message sequence in an NFV process.

FIG. 4 illustrates an exemplary message sequence between the mobile terminals in an ad-hoc group and the NFV management and application servers (322 and 324) in a typical NFV process. Suppose a train load of people moves across a city. On the train, a number of mobile terminals (302, 304) are present. Some of them have subscribed to NFV services and have downloaded and installed NFV management software, e.g., NFV management client. See Step 410 in FIG. 4. Carrier operators may encourage users to subscribe to NFV services by offering benefits such as reduced service charges or rates or preferential treatment at times of congestion. Each mobile terminal also subscribes to one or more NFV applications with the NFV application server 324 and has installed the corresponding NFV application software, e.g., NFV application clients. In some embodiments, the download and configuration of NFV application software by mobile terminals may be a separate step from the configuration of NFV management software. For example, users can select or change their selection of an NFV application any time after they have subscribed to the NFV services. In some embodiments, the configuration of NFV application software may take place during the configuration of NFV management software. See Step 420 in FIG. 4.

While on the train, the NFV-enabled mobile terminals, 302 and 304, establish communication with the NFV management server 322. The NFV management server 322 collects a profile from each mobile terminal that has subscribed to NFV services. The profile may include the mobile terminal's capabilities, which may be collected once when the mobile terminal, 302 and 304, is turned on. The profile may also include the mobile terminal's battery state and spare processing capacity, which may be collected periodically from the mobile terminal, 302 and 304. See Step 430 in FIG. 4.

Some of the mobile terminals on the train are also ProSe-enabled. The mobile terminals come into the close proximity of each other. Via interaction with a network device, such as a 3GPP ProSe function, the mobile terminals establish an ad-hoc group among themselves. The ad-hoc group is open. Mobile terminals are added to the group as they arrive. Mobile terminals may be removed from the group when they leave, or when they are turned off, or when their battery level becomes too low, or when their spare capacity falls below a threshold. The NFV management server 322 acts as a ProSe application server and manages the ad-hoc group as devices join or leave the group. See Step 440 in FIG. 4

The NFV management server 322 discovers that the newly formed ad-hoc group has met certain criteria. The criteria may be specific to an NFV application or generic to any NFV application. For example, the criteria may include that the number of mobile terminals exceeds a threshold or the collective spare processing capacity exceeds a threshold. For some NFV applications, the spare processing capacity threshold may be higher than other NFV applications. For another example, one criterion may be that the mobile terminals in the group have stayed together for a certain period of time, e.g., for the last 10 minutes. See Step 450 in FIG. 4.

One of the criteria for establishing an ad-hoc group for an NFV application is that how long the ad-hoc group will remain as a group. In many instances, the proximity of a group of mobile terminals is simply a chance occurrence and the group will soon disperse. Such groups are not suitable for network function offloading. The NFV management server 322 may rely on the location prediction function 326 to predict the duration of the group. For example, for those mobile terminals that are inside an arena during a sporting event, inside a hotel during nighttime, or on a moving train, the group will remain as a group for an extended time, long enough to allow the execution of a network function to finish. See Step 460 in FIG. 4.

Once the NFV management server 322 discovers a suitable ad-hoc group for NFV, the NFV management server 322 establishes communication with one of the NFV application servers and provides information regarding the ad-hoc group to the NFV application server 324. The information may include the mobile terminals that are in the group and the estimated duration of the group. See Step 470 in FIG. 4.

In some embodiments, the NFV management server 322 may select an NFV application for the newly discovered ad-hoc group based on the profiles collected from the members of the group and the requirements of the NFV application. The NFV management server 322 may select an NFV application for the ad-hoc group based on the NFV application or applications to which the members of the group have subscribed.

Upon receiving the information of the ad-hoc group, the NFV application server 324 downloads data and configuration parameters for the corresponding NFV application to the mobile terminals. In some embodiments, the data and configuration parameters may be downloaded to the mobile terminals in accordance with the different tasks that have been assigned to each mobile terminal. In some embodiments, the data and configuration parameters may be downloaded to one mobile terminal, e.g., the member with the largest spare capacity, to be distributed to other mobile terminals in the group. Once the data and configuration parameters have been received by the group, the mobile terminals start executing the network function or service. See Step 480 in FIG. 4.

During the execution of the network function, the mobile terminals in the ad-hoc group exchange data and other information with each other. The configuration parameters downloaded from the NFV application server may include indications where or which mobile terminal in the group may hold certain pieces of data or information. In some embodiments, a mobile terminal in the ad-hoc group sends a request to another terminal for data via device-to-device communication link (PC5 in FIG. 2). See Step 490 in FIG. 4.

During the execution of the network function, the membership of the ad-hoc group may change. A mobile terminal may leave the ad-hoc group before the execution of the network function has completed. For example, the user may get off the train at a local stop, leave a sporting event early or simply switch off the mobile terminal. If this happens, the NFV management server 322 discovers that the mobile terminal has left the group, and informs the NFV application server 324. In response, the NFV application server reallocates the user's data and configuration parameters to other terminals within the group. See Step 510 in FIG. 4

Once the network function is complete, the mobile terminals upload the results to the NFV application server 324. See Step 520 in FIG. 4.

Figure 5:
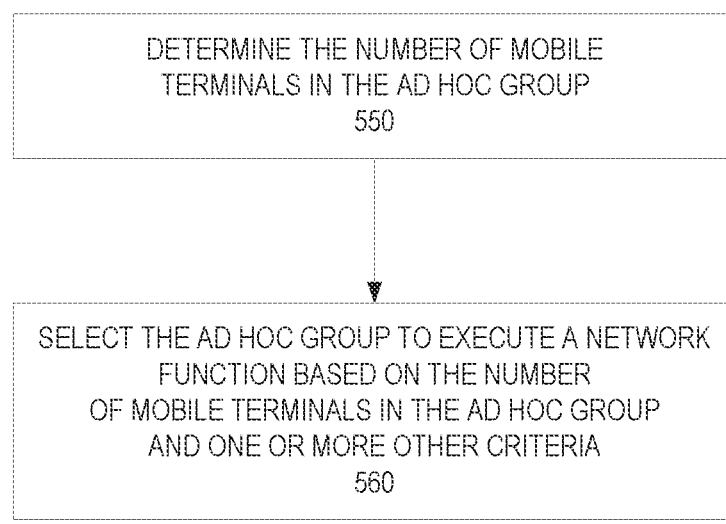
FIG. 5 illustrates an exemplary method implemented in an NFV management server for selecting an ad-hoc group for an NFV process.

FIG. 5 illustrates an exemplary process of selecting an ad-hoc group for NFV by an NFV management server 322.

The ad-hoc group comprises a plurality of mobile terminals located in the close proximity of each other. The NFV management server 322 determines the number of mobile terminals in the ad-hoc group (step 550). The NFV management server 322 then selects the ad-hoc group to execute a network function based on the number of mobile terminals in the ad-hoc group and one or more other criteria (step 560). In some embodiments, the NFV management server 322 may not have the knowledge of the criteria specific to each application. The NFV management server 322 simply selects the ad-hoc group as a candidate group for NFV. The NFV application server 324 may determine whether this ad-hoc group is suitable for the NFV application for which the NFV application server 322 is responsible. The NFV application server 324 may select one ad-hoc group from a pool of candidate ad-hoc groups.

Figure 6:
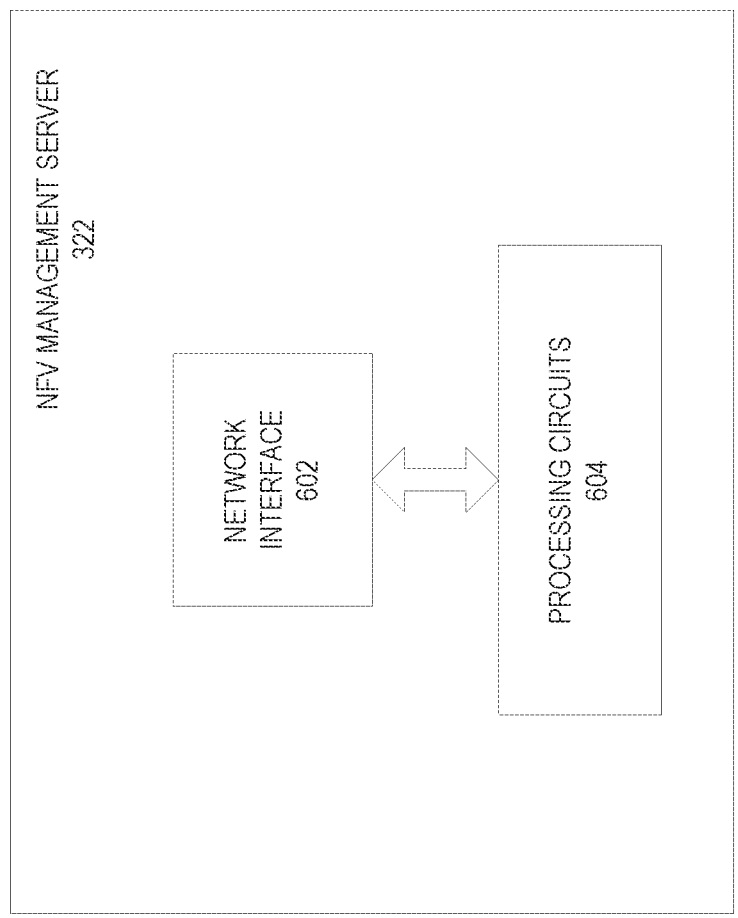
FIG. 6 illustrates an exemplary NFV management server.

FIG. 6 illustrates an exemplary NFV management server 322. The NFV management server 322 comprises a network interface 602 and one or more processing circuits 604. The network interface 602 is configured for transmitting and receiving data to and from a plurality of mobile terminals via a radio access network. The one or more processing circuits 604 are configured to determine the number of mobile terminals in the ad-hoc group and select the ad-hoc group for executing the network function (or as a candidate ad-hoc group) based on the number of mobile terminals in the ad-hoc group and one or more other criteria.

In some embodiments, a computer program may be implemented to carry out the steps performed by the one or more processing circuit 604. The computer program may comprise a first module and a second module. The first module is configured to determine the number of mobile terminals in the ad-hoc group. The second module is configured to select the ad-hoc group for executing the network function (or as a candidate ad-hoc group) based on the number of mobile terminals in the ad-hoc group and one or more other criteria.

Figure 7:
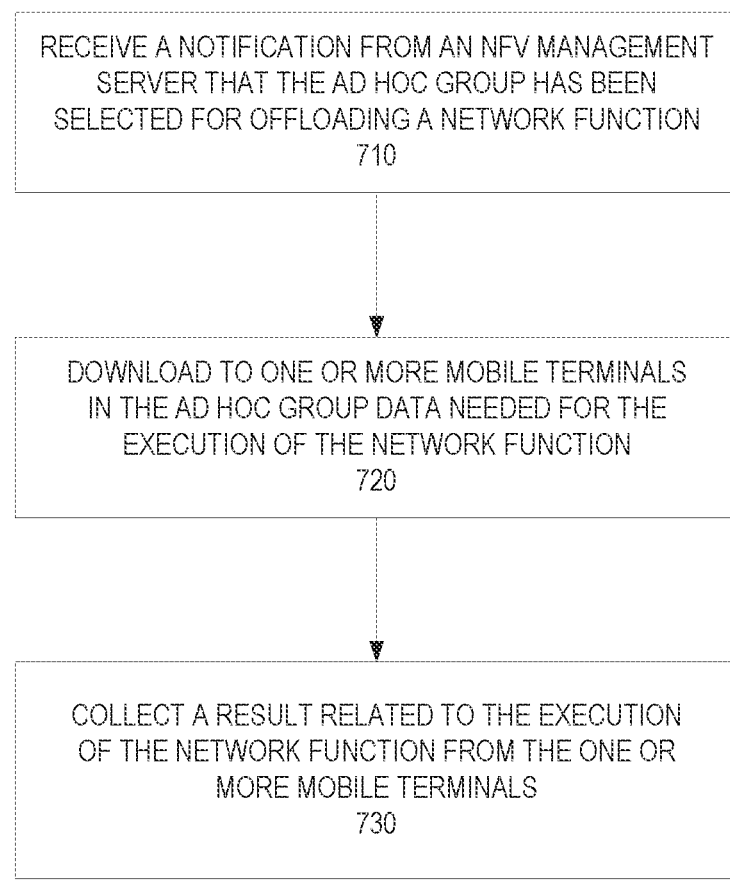
FIG. 7 illustrates an exemplary method implemented in an NFV application server for offloading a new function to a selected ad-hoc group.

FIG. 7 illustrates an exemplary process in an NFV application server 324 for virtualizing a network function. The NFV application server 324 receives a notification from an NFV management server 322 that an ad-hoc group has been selected for executing a network function (step 710). The NFV application server 324 then downloads to one or more mobile terminals 302 and 304 in the ad-hoc group data needed for the execution of the network function (step 720). After the network function is finished, the NFV application server 324 collects the results from the mobile terminals 302 and 304 (step 730).

Figure 8:
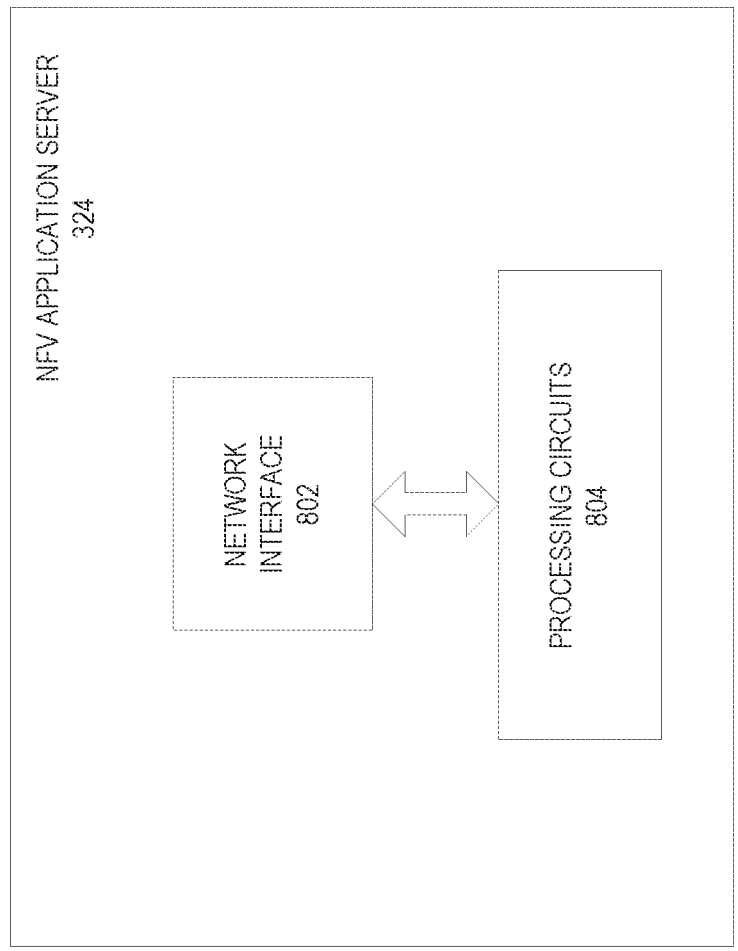
FIG. 8 illustrates an exemplary NFV application server.

FIG. 8 illustrates an exemplary NFV application server 324 configured for managing an ad-hoc group to execute a network function. The NFV application server 324 comprises a network interface 802 and one or more processing circuit 804. The network interface 802 is configured for transmitting and receiving data to and from mobile terminals via a radio access network and for communicating with an NFV management server. The one or more processing circuits 804 are configured to carry out the exemplary process described in FIG. 7.

In some embodiments, a computer program may be implemented to carry out the steps performed by the one or more processing circuit 804. The computer program may comprise a first, second, and third module. The first module is configured to process a notification received from an NFV management server 322 that an ad-hoc group has been selected for executing a network function (step 710). The second module is configured to download to one or more mobile terminals 302 and 304 in the ad-hoc group data needed for the execution of the network function. The third module is configured to collect the results from the mobile terminals 302 and 304.

Figure 9:
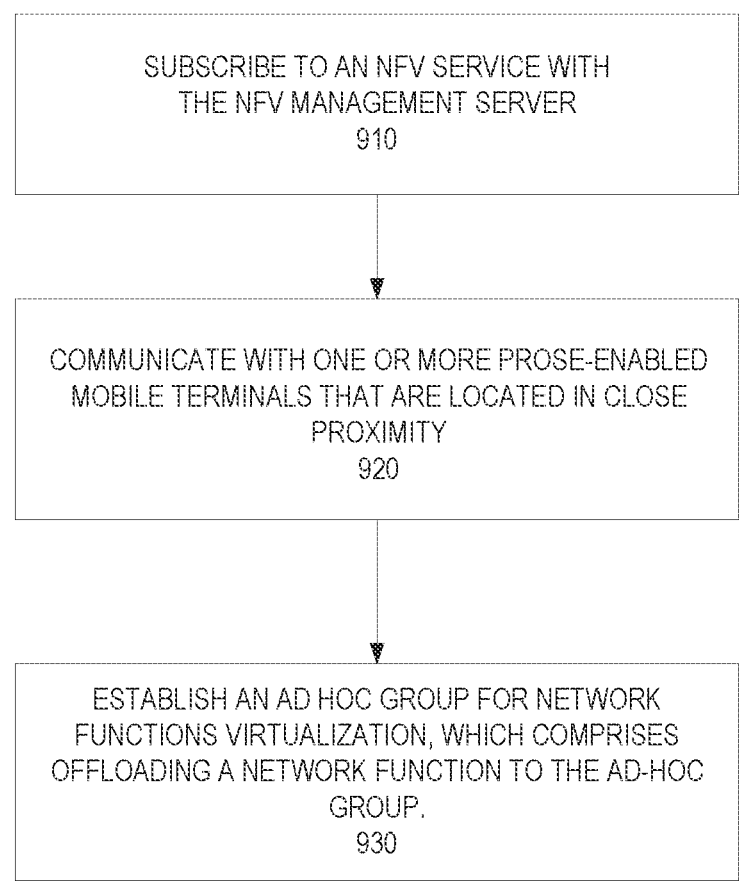
FIG. 9 illustrates an exemplary process configuring a ProSe-enabled mobile terminal for NFV.

FIG. 9 illustrates an exemplary process in a mobile terminal 302 that is ProSe-enabled and NFV-enabled. The mobile terminal 302 has subscribed to an NFV service with the NFV management server 322 (step 910). The mobile terminal 302 communicates with one or more ProSe-enabled mobile terminals 304 that are located in close proximity (step 920). The mobile terminal 302 then establishes an ad-hoc group for NFV (step 930). The NFV involves off-loading a network function from the network onto the ad-hoc group.

Figure 10:
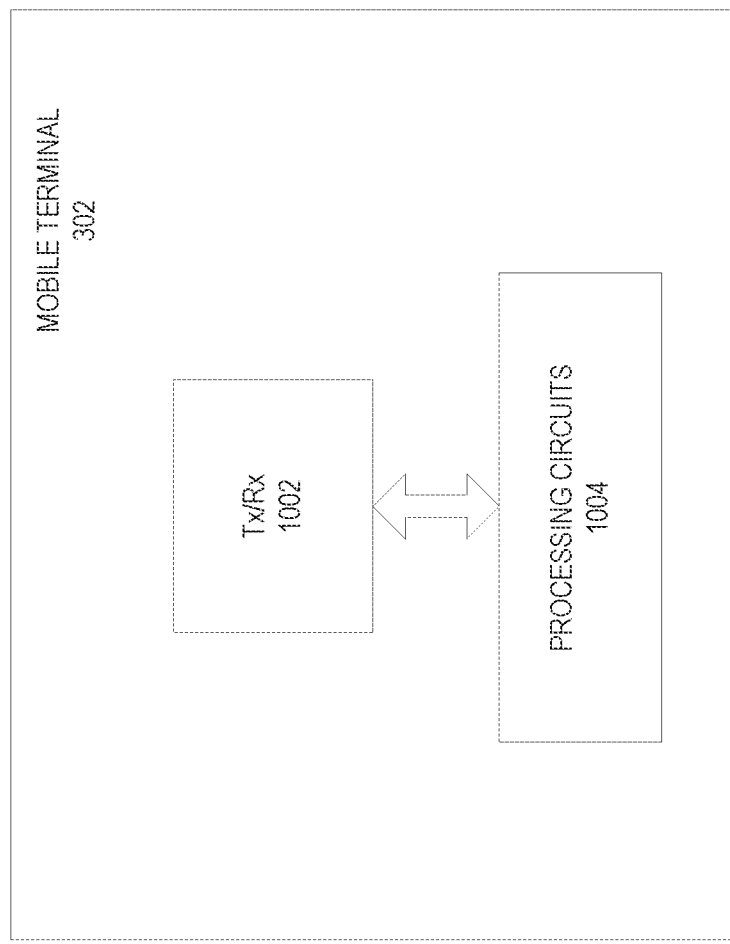
FIG. 10 illustrates an exemplary ProSe-enabled NFV-enabled mobile terminal.

FIG. 10 illustrates an exemplary mobile terminal 302 comprising a transceiver 1002 and one or more processing circuits 1004. The transceiver 1002 is configured to communication with a NFV management server 322 and for communicating with other mobile terminals. In some embodiments, the transceiver 1002 is further configured to communicate with an NFV application server 324. The one or more processing circuits 1004 are configured to subscribe to an NFV service with the NFV management server 302 and enable device-to-device communications with other ProSe-enabled mobile terminals located in close proximity. The one or more processing circuits 1004 is also configured to establish an ad-hoc group for virtualizing a network function. In some embodiments, the one or more processing circuits 1004 are further configured to receive data from the NFV application server 324 related to the execution of the network function by the ad-hoc group, execute a designated portion of the network function, and report the result of the execution to the NFV application server 324 when the network function is finished.

The methods and techniques disclosed herein can be implemented as software programs. The apparatus described herein can be implemented as computers executing software programs stored in memory. In some embodiments, the advanced techniques and apparatus disclosed herein may be implemented as computer software programs. In some embodiments, the functionalities of the NFV management server 322 may be implemented as software modules. The NFV management server 322 may include a monitoring module 1102 and a selection module 1104. The monitoring module 1102 is configured to determine the number of mobile terminals in the ad-hoc group. The selection module 1104 is configured to select the ad-hoc group for executing the network function based on the number of mobile terminals in the ad-hoc group and other criteria. In some embodiments, the selection module 1104 is further configured to determine a minimum number of mobile terminals that is required for virtualizing the network function and select the ad-hoc group for executing the network function if the number of mobile terminals in the ad-hoc group equals or exceeds the minimum number of mobile terminals required for virtualizing the network function. In some embodiments, the monitoring module 1102 is further configured to evaluate a spare capacity or spare processing capacity for each of the mobile terminals. The selection module 1104 selects the ad-hoc group based on whether the spare battery capacities or spare processing capacities of the mobile terminals are suitable for virtualizing the network function. In some embodiments, the monitoring module 1102 is further configured to estimate a duration that the ad-hoc group will remain in close proximity. The monitoring module 1102 may communicate with a location prediction function to predict future locations of the mobile terminals and estimate the duration of the ad-hoc group based on the predicted future location. The selection module 1104 selects the ad-hoc group based on whether the estimated duration is suitable for virtualizing the network function.

In some embodiments, the functionalities of the NFV application server 324 may be implemented as a notification processing module 1202, a data module 1204, and a collection module 1206. The notification processing module 1202 is configured to process a notification received from an NFV management server (322) that the ad-hoc group has been selected for executing a network function. The data module 1204 is configured to send data to one or more mobile terminals (302, 304) in the ad-hoc group for the execution of the network function. The collection module 1206 is configured to collect a result related to the execution of the network function from the one or more mobile terminals. In some embodiments, the NFV application server may further comprise an adjustment module configured to adjust the ad-hoc group when mobile terminals join or leave the ad-hoc group and redistribute the execution of the network function among the adjusted ad-hoc group.

In some embodiments, the functionalities of the mobile terminal 302 may be implemented as a subscription module 1302, a data processing module 1304, and a group establishing module 1306. The subscription module 1302 is configured to subscribe to an NFV service with an NFV management server 322. The data processing module 1304 is configured to process data received from or to be transmitted to one or more other mobile terminals that are configured for device-to-device communication and are located in close proximity. The group establishing module 1306 is configured to establish an ad-hoc group for virtualizing a network function based on the data received from the NFV management server 322. In some embodiments, the data processing module 1304 may be further configured to process data received from an NFV application server 324 and execute a designated portion of the network function based on the data received from the application server 324. In some embodiments, the mobile terminal 302 may further comprise a reporting module configured to report, to the NFV application server 324, a result related to the execution of the network function.

The methods and techniques disclosed herein allow a mobile telecommunication network to offload network functions to the user equipment or mobile terminals, thus saving resources and processing capacities within the network. Further, the network functions virtualization is realized in an ad-hoc group of mobile terminals that remain in close proximity for an extended time. During the execution of the network function by the ad-hoc group, device-to-device communication is localized within the group, without taxing the radio access resources between the mobile terminals of the group and the radio access network.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of virtualizing a network function among an ad-hoc group, the ad-hoc group comprising a plurality of mobile terminals located sufficiently close to each other for maintaining the ad-hoc group, the method comprising:
 evaluating a spare battery capacity or spare processing capacity for each of the mobile terminals;
 estimating a duration of how long the ad-hoc group will be able to remain as the ad-hoc group; and
 selecting the ad-hoc group to execute the network function based on:
  whether the spare battery capacity or spare processing capacity of each of the mobile terminals is sufficient with which to execute the network function; and
  whether the estimated duration is sufficient with which to execute the network function.

2. The method of claim 1, wherein the selecting comprises:
 determining a minimum number of mobile terminals that is required for virtualizing the network function; and
 selecting the ad-hoc group to execute the network function if the number of mobile terminals in the ad-hoc group equals or exceeds the minimum number of mobile terminals required for virtualizing the network function.

3. The method of claim 1, wherein the estimating the duration comprises:
 predicting future locations and/or movements of each of the mobile terminals in the ad-hoc group; and
 estimating the duration that each of the plurality of mobile terminals in the ad-hoc group will be able to remain sufficiently close to each other based on the future locations and/or movements of each of the mobile terminals in the ad-hoc group.

4. A network functions virtualization (NFV) management server for virtualizing a network function among an ad-hoc group that comprises a plurality of mobile terminals located sufficiently close to each other for maintaining the ad-hoc group, the management server comprising:
 a network interface for transmitting and receiving data to and from the plurality of mobile terminals via a radio access network; and
 processing circuitry configured to:
  evaluate a spare battery capacity or spare processing capacity for each of the mobile terminals;
  estimate a duration of how long the ad-hoc group will be able to remain as the ad-hoc group; and
  select the ad-hoc group to execute the network function based on:
   whether the spare battery capacity or spare processing capacity of each of the mobile terminals is sufficient with which to execute the network function; and
   whether the estimated duration is sufficient with which to execute the network function.

5. The NFV management server of claim 4, wherein the processing circuitry is configured to, when selecting the ad-hoc group:
 determine a minimum number of mobile terminals that is required for virtualizing the network function; and
 select the ad-hoc group to execute the network function if the number of mobile terminals in the ad-hoc group equals or exceeds the minimum number of mobile terminals required for virtualizing the network function.

6. The NFV management server of claim 4, wherein the processing circuitry is configured to:
 communicate, via the network interface, with a location prediction function to predict future locations of each of the mobile terminals and/or movements of each of the mobile terminals in the ad-hoc group; and
 estimate the duration that each of the plurality of mobile terminals in the ad-hoc group will be able to remain sufficiently close to each other based on the future locations and/or movements of each of the mobile terminals in the ad-hoc group.

\* \* \* \* \*

UNITED STATES PATENT AND TRADEMARK OFFICE
CERTIFICATE OF CORRECTION

PATENT NO. : 11,632,434 B2
APPLICATION NO. : 17/557600
DATED : April 18, 2023
INVENTOR(S) : Lawrenson et al.

It is certified that error appears in the above-identified patent and that said Letters Patent is hereby corrected as shown below:

In the Drawings

In Fig. 1, Sheet 1 of 13, delete "FIG" and insert -- FIG. --, therefor.

In Fig. 2, Sheet 2 of 13, delete "FIG" and insert -- FIG. --, therefor.

In Fig. 3, Sheet 3 of 13, delete "FIG" and insert -- FIG. --, therefor.

In Fig. 4, Sheet 4 of 13, delete "FIG" and insert -- FIG. --, therefor.

In Fig. 5, Sheet 5 of 13, delete "FIG" and insert -- FIG. --, therefor.

In Fig. 6, Sheet 6 of 13, delete "FIG" and insert -- FIG. --, therefor.

In Fig. 7, Sheet 7 of 13, delete "FIG" and insert -- FIG. --, therefor.

In Fig. 8, Sheet 8 of 13, delete "FIG" and insert -- FIG. --, therefor.

In Fig. 9, Sheet 9 of 13, for Step "930", in Line 4, delete "GROUP." and insert -- GROUP --, therefor.

In Fig. 9, Sheet 9 of 13, delete "FIG" and insert -- FIG. --, therefor.

In Fig. 10, Sheet 10 of 13, delete "FIG" and insert -- FIG. --, therefor.

Figure 11:
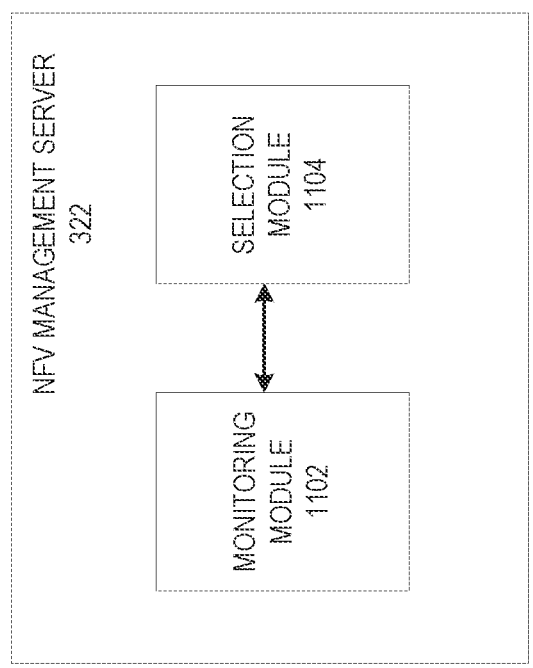
FIG. 11 illustrates exemplary software modules implemented for an NFV management server.

In Fig. 11, Sheet 11 of 13, delete "FIG" and insert -- FIG. --, therefor.

Figure 12:
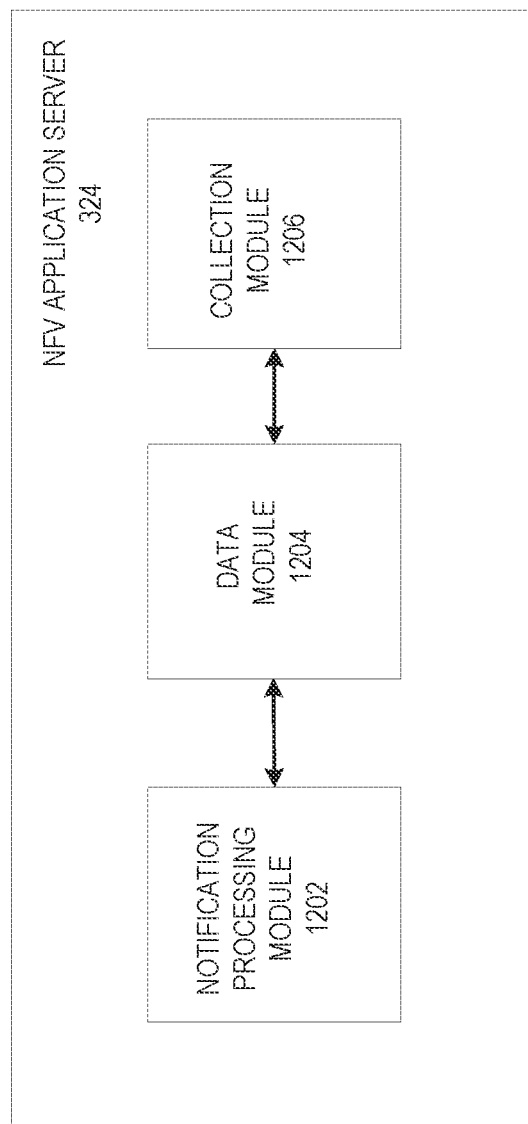
FIG. 12 illustrates exemplary software modules implemented for an NFV application server.

In Fig. 12, Sheet 12 of 13, delete "FIG" and insert -- FIG. --, therefor.

In Fig. 13, Sheet 13 of 13, delete "FIG" and insert -- FIG. --, therefor.

Signed and Sealed this
Thirtieth Day of July, 2024

Katherine Kelly Vidal
*Director of the United States Patent and Trademark Office*

CERTIFICATE OF CORRECTION (continued)
U.S. Pat. No. 11,632,434 B2

In the Specification

In Column 1, Line 8, delete "2017," and insert -- 2017, now Pat. No. 11,218,552, --, therefor.

In Column 1, Line 9, delete "filed" and insert -- filed on --, therefor.

In Column 3, Line 30, delete "un-utilized." and insert -- unutilized. --, therefor.

In Column 5, Line 20, delete "nighttime, that the" and insert -- nighttime, the --, therefor.

In Column 6, Line 31, delete "is the" and insert -- in the --, therefor.

In Column 6, Line 42, delete "NFV application server 322" and insert -- NFV application server 324 --, therefor.

In Column 6, Line 48, delete "NFV application server 322" and insert -- NFV application server 324 --, therefor.

In Column 7, Line 25, delete "application any" and insert -- application at any --, therefor.

In Column 8, Line 46, delete "indications where" and insert -- indications of where --, therefor.

In Column 8, Line 55, delete "has completed." and insert -- has been completed. --, therefor.

In Column 9, Line 14, delete "NFV application server 322" and insert -- NFV application server 324 --, therefor.

In Column 9, Line 30, delete "more processing circuit" and insert -- more processing circuits --, therefor.

In Column 9, Lines 52-53, delete "more processing circuit" and insert -- more processing circuits --, therefor.

In Column 9, Line 61, delete "more processing circuit" and insert -- more processing circuits --, therefor.

In Column 10, Lines 16-17, delete "to communication with" and insert -- to communicate with --, therefor.

In Column 10, Line 22, delete "NFV management server 302" and insert -- NFV management server 322 --, therefor.

In Column 11, Line 37, delete "the application server 324." and insert -- the NFV application server 324. --, therefor.